(12) United States Patent
Kim et al.

(10) Patent No.: US 9,648,554 B2
(45) Date of Patent: May 9, 2017

(54) MOBILE TERMINAL FOR CELL RESELECTION IN CELLULAR MOBILE COMMUNICATION SYSTEM AND METHODS THEREFOR

(71) Applicants: Jong-Han Kim, Gyeonggi-do (KR); Ki-Hyun Do, Gyeonggi-do (KR); Yong-Duk Cho, Seoul (KR)

(72) Inventors: Jong-Han Kim, Gyeonggi-do (KR); Ki-Hyun Do, Gyeonggi-do (KR); Yong-Duk Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/829,043

(22) Filed: Aug. 18, 2015

(65) Prior Publication Data

US 2016/0050592 A1     Feb. 18, 2016

Related U.S. Application Data

(60) Provisional application No. 62/038,677, filed on Aug. 18, 2014.

(30) Foreign Application Priority Data

Dec. 3, 2014 (KR) .......................... 10-2014-0172188

(51) Int. Cl.
*H04W 4/00*     (2009.01)
*H04W 48/16*     (2009.01)
*H04W 48/18*     (2009.01)
*H04W 88/02*     (2009.01)

(52) U.S. Cl.
CPC ............ *H04W 48/16* (2013.01); *H04W 48/18* (2013.01); *H04W 88/02* (2013.01)

(58) Field of Classification Search
None
See application file for complete search history.

(56) References Cited

U.S. PATENT DOCUMENTS

| 5,854,981 A * | 12/1998 | Wallstedt .......... H04W 36/0083 455/436 |
| 2003/0202541 A1* | 10/2003 | Lim ..................... H04B 1/7083 370/503 |
| 2005/0266845 A1* | 12/2005 | Aerrabotu ......... H04W 36/0083 455/436 |

(Continued)

FOREIGN PATENT DOCUMENTS

| EP | 2852224 | 3/2015 |
| JP | 2014131323 | 7/2014 |

(Continued)

*Primary Examiner* — Shantell L Heiber
(74) *Attorney, Agent, or Firm* — The Farrell Law Firm, P.C.

(57) ABSTRACT

Methods and apparatuses are provided for cell reselection at a mobile terminal. A first cell measurement is performed with respect to a serving cell and a first set of one or more cells included in a neighbor cell list. A second cell measurement is performed to detect a second set of one or more cells that are not included in the neighbor cell list, based on the first cell measurement. One or more candidate cells that satisfy cell reselection criteria are determined from among the first set of one or more cells and the second set of one or more cells. One of the one or more candidate cells is reselected.

16 Claims, 9 Drawing Sheets

(56) References Cited

U.S. PATENT DOCUMENTS

| | | |
|---|---|---|
| 2007/0223510 A1 | 9/2007 | Joo |
| 2009/0034452 A1 | 2/2009 | Somasundaram et al. |
| 2009/0232013 A1 | 9/2009 | Kumpula et al. |
| 2009/0270079 A1* | 10/2009 | Han .................. H04W 36/0061 455/414.1 |
| 2011/0014919 A1* | 1/2011 | Otte .................. H04W 36/0061 455/442 |
| 2011/0032889 A1 | 2/2011 | Lee et al. |
| 2011/0122823 A1 | 5/2011 | Chen |
| 2011/0143752 A1 | 6/2011 | Hong |
| 2011/0171962 A1* | 7/2011 | Iwamura .............. H04J 11/0093 455/437 |
| 2011/0263260 A1* | 10/2011 | Yavuz ................ H04W 36/0083 455/437 |
| 2012/0208535 A1 | 8/2012 | Martin |
| 2012/0322446 A1* | 12/2012 | Ramachandran ..... H04W 48/18 455/436 |
| 2014/0038597 A1 | 2/2014 | Wang at al. |
| 2014/0162650 A1 | 6/2014 | Islam et al. |
| 2014/0185475 A1 | 7/2014 | Ji et al. |
| 2014/0206355 A1 | 7/2014 | Pani et al. |

FOREIGN PATENT DOCUMENTS

| | | |
|---|---|---|
| KR | 100725777 | 6/2007 |
| KR | 1020090081728 | 7/2009 |
| KR | 1020100063034 | 6/2010 |
| KR | 1020110068592 | 6/2011 |
| KR | 1020110120615 | 11/2011 |
| KR | 1020120074840 | 7/2012 |
| KR | 1020140010698 | 1/2014 |
| KR | 1020140019864 | 2/2014 |
| KR | 1020140021626 | 2/2014 |
| KR | 1020140039149 | 4/2014 |
| KR | 1020140057686 | 5/2014 |

* cited by examiner

MOBILE TERMINAL FOR CELL RESELECTION IN CELLULAR MOBILE COMMUNICATION SYSTEM AND METHODS THEREFOR

PRIORITY

This application claims priority under 35 U.S.C. §119(e) to U.S. Provisional Patent Application No. 62/038,677, which was filed in the United States Patent and Trademark Office on Aug. 18, 2014, and claims priority under 35 U.S.C. §119(a) to Korean Application Serial No. 10-2014-0172188, which was filed in the Korean Intellectual Property Office on Dec. 3, 2014, the contents of which are incorporated herein by reference.

BACKGROUND

1. Field of the Disclosure

The present disclosure relates generally to cell reselection of a mobile terminal in a cellular mobile communication system, and more particularly, to mobile terminal cell reselection when cells included in a neighbor cell list are not detected in an idle state, and an operation method thereof.

2. Description of the Related Art

In a cellular mobile communication system, when a mobile terminal enters an idle state, the mobile terminal determines whether paging is received based on a paging period, and executes a cell measurement procedure with respect to cells included in a neighbor cell list. For example, reception power of neighbor cells may be measured to determine cell reselection criteria for the cell measurement procedure. The neighbor cell list may be included in a system information block (SIB) and may be broadcasted from each cell.

When cells satisfying the cell reselection criteria are retrieved from a result of the cell measurement procedure performed based on the neighbor cell list, during a predetermined period of time, a corresponding cell may be reselected.

However, when the neighbor cell list, which is obtained from the broadcasted system information, is erroneously configured, the mobile terminal may fail to detect a neighbor cell for cell reselection, even though a channel quality of a serving cell has become poor. In this instance, when a neighbor cell for cell reselection is not detected during the predetermined period of time, the mobile terminal determines that the mobile terminal is 'out-of-service', and proceeds with a cell selection procedure. However, during a waiting time required for that the mobile terminal is 'out-of-service' and a time for performing cell selection, reception of paging may be limited.

SUMMARY

The embodiments herein have been made to address at least the above problems and/or disadvantages and to provide at least the advantages described below. Accordingly, an aspect of the embodiments provides a mobile terminal for cell reselection in a cellular mobile communication system and an operation method thereof.

Various embodiments provide a method and an apparatus for performing cell reselection by detecting a cell that is not included in a neighbor cell list, when a cell included in a neighbor cell list is not detected around a mobile terminal.

According to various embodiments of the present disclosure, a method for a mobile terminal to execute cell reselection is provided. The method includes; performing a first cell measurement with respect to a serving cell and one or more cells included in a neighbor cell list, performing a second cell measurement to detect a second set of one or more cells that are not included in the neighbor cell list, based on the first cell measurement, determining one or more candidate cells that satisfy cell reselection criteria, from among the first set of one or more cells and the second set of one or more cells, and reselecting one of the one or more candidate cells.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
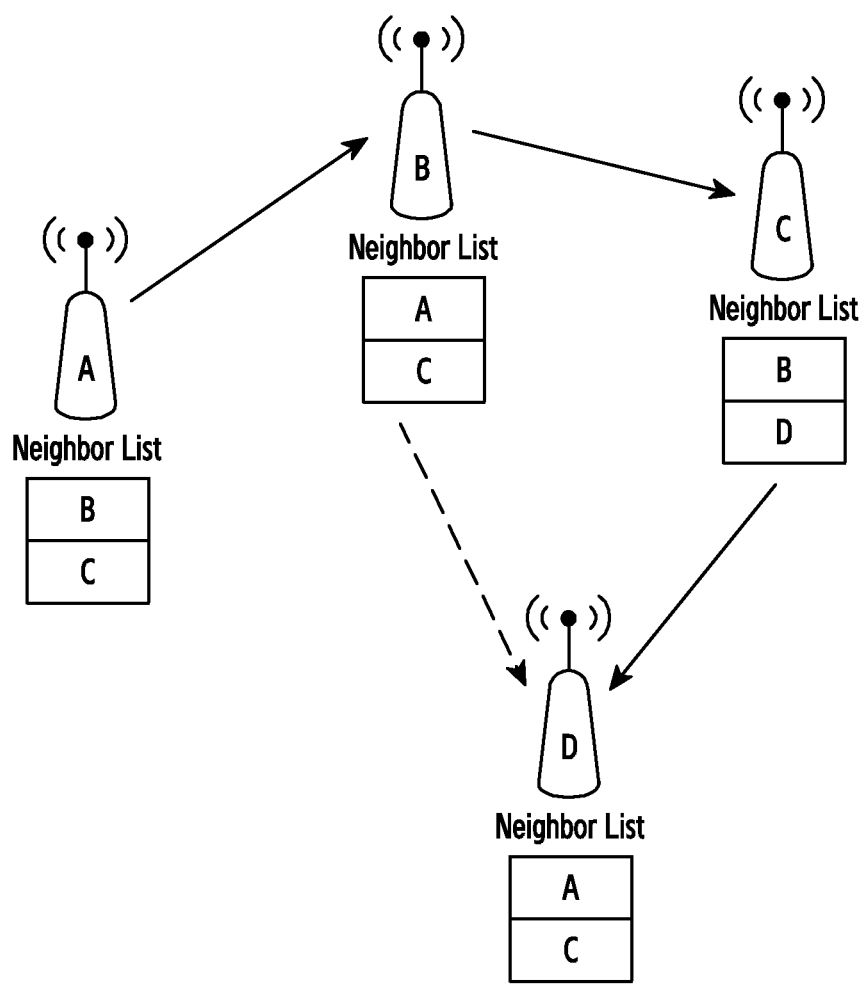
FIG. 1 is a diagram illustrating a scenario in which a neighbor cell for cell reselection is not detected in a cellular mobile communication system, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The term "include" or the phrase "may include" refers to the existence of a corresponding disclosed function, operation, or component, which can be used in various embodiments of the present disclosure, and does not limit one or more additional functions, operations, or components. In the present disclosure, terms such as "include" or "have" may be construed to denote a certain characteristic, number, step, operation, constituent element, component, or a combination thereof, but may not be construed to exclude the existence of or a possibility of one or more additional characteristics, numbers, steps, operations, constituent elements, components, or combinations thereof.

The term "or", as used herein, includes any or all of combinations of listed words. For example, the expression "A or B" may include A, may include B, or may include both A and B.

The expressions "1", "2", "first", or "second", as used herein, may modify various components of various embodiments but does not limit the corresponding components. For example, the above expressions do not limit the sequence and/or importance of the corresponding constituent elements. The above expressions are used merely for the purpose of distinguishing an element from the other elements. For example, a first user device and a second user device indicate different user devices although both of them are user devices. Without departing from the scope of the present disclosure, a first structural element may be referred to as a second structural element. Similarly, the second structural element may also be referred to as the first structural element.

It should be noted that if it is described that an element is "coupled" or "connected" to another element, the first element may be directly coupled or connected to the second element, and a third element may be "coupled" or "connected" between the first and second elements. Contrarily, when an element is "directly coupled" or "directly connected" to another element, it may be construed that a third element does not exist between the first element and the second element.

The terms used herein are used to describe a specific embodiment, and are not intended to limit the present disclosure. Singular forms are intended to include plural forms as well, unless the context clearly indicates otherwise.

Unless defined differently, all terms used herein, which include technical or scientific terminologies, have the same meanings as those understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device, according to various embodiments of the present disclosure, may be a device with a communication function. For example, the electronic device may be embodied as at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be embodied as a smart home appliance with a communication function. The smart home appliance may be at least one of, for example, a television, a Digital Versatile Disc (DVD) player, an audio system, a refrigerator, an air conditioner, a vacuum cleaner, an oven, a microwave oven, a washing machine, an air cleaner, a set-top box, a TV box, a game console, an electronic dictionary, an electronic key, a camcorder, and an electronic picture frame.

According to some embodiments, the electronic device may be embodied as at least one of various medical appliances (e.g., magnetic resonance angiography (MRA), magnetic resonance imaging (MRI), a computed tomography (CT) machine, and an ultrasonic machine), navigation devices, global positioning system (GPS) receivers, event data recorders (EDRs), flight data recorders (FDRs), automotive infotainment devices, electronic equipment for ships (e.g., navigation equipment for ships, gyrocompasses, or the like), avionics, security devices, head units for vehicles, industrial or home robots, automated teller machines (ATM) of banking facilities, and point of sales (POSs) of shops.

According to another embodiment, the electronic device may be embodied as at least one of furniture or a part of a building/structure having a communication function, electronic boards, electronic signature receiving devices, projectors, or various measuring equipment (e.g., equipment for a water supply, an electricity, gases or radio waves). An electronic device, according to various embodiments of the present disclosure, may be a combination of one or more of the various above described devices. Also, an electronic device, according to various embodiments of the present disclosure, may be a flexible device. Further, an electronic device, according to various embodiments of the present disclosure, is not limited to the above described devices.

Hereinafter, an electronic device, according to various embodiments of the present disclosure, will be described with reference to the accompanying drawings. The term "user", as used herein, may refer to a person who uses an electronic device or a device (for example, an artificial intelligence electronic device) that uses an electronic device.

According to an embodiment of the present disclosure, a method for a mobile terminal to execute cell reselection is provided. A first cell measurement is performed with respect to a serving cell and a first set of one or more cells included in a neighbor cell list. A second cell measurement is performed to detect a second set of one or more cells that are not included in the neighbor cell list, based on the first cell measurement. One or more candidate cells that satisfy cell reselection criteria are determined from among the first set of one or more cells and the second set of one or more cells. One of the one or more candidate cells is reselected.

According to another embodiment of the present disclosure, a mobile terminal for cell reselection is provided. The mobile terminal includes a measurement module to perform a first cell measurement with respect to a serving cell and a first set of one or more cells included in a neighbor cell list, and to perform a second cell measurement to detect a second set of one or more cells that are not included in the neighbor cell list, based on the first cell measurement; a determining module to determine one or more candidate cells that satisfy cell reselection criteria, from among the first set of one or more cells and the second set of one or more cells; and a cell reselection control module to reselect one of the one or more candidate cells.

According to another embodiment of the present disclosure, an electronic device is provided. The electronic device includes one or more processors; a memory; and one or more programs that are stored in the memory and are configured to be implemented by the one or more processors, wherein the one or more programs include instructions for performing: determining whether to execute a measurement with respect to at least one cell that is not included in a neighbor cell list, based on at least one condition; performing the measurement with respect to the at least one cell that is not included in the neighbor cell list when the at least one condition is satisfied; and selecting a cell that satisfies cell reselection criteria from among the at least one cell that is not included in the neighbor cell list.

According to another embodiment of the present disclosure, a system-on-chip for cell reselection of a mobile terminal is provided. The system-on-chip is configured to: perform a first cell measurement with respect to a serving cell and a first set of one or more cells included in a neighbor cell list; perform a second cell measurement to detect a second set of one or more cells that are not included in the neighbor cell list, based on the first cell measurement; determine one or more candidate cells that satisfy cell reselection criteria, from among the first set of one or more cells and the second set of one or more cells; and reselect one of the one or more candidate cells.

According to another embodiment of the present disclosure, a method for a mobile terminal to execute cell reselection is provided. The method includes: performing a first cell measurement with respect to a serving cell and a first set of one or more cells included in a neighbor cell list; determining whether at least one condition is satisfied with respect to at least one of the serving cell and the first set of one or more cells; performing a second cell measurement to detect a second set of one or more cells that are not included in the neighbor cell list, when the at least one condition is satisfied; determining one or more candidate cells that satisfy cell reselection criteria from among the first set of one or more cells when the at least one condition is not satisfied, and from among the first set of one or more cells and the second set of one or more cells when the at least one condition is satisfied; and reselecting one of the one or more candidate cells.

According to another embodiment of the present disclosure, a mobile terminal for cell reselection is provided. The mobile terminal includes: a measurement module to perform a first cell measurement with respect to a serving cell and a first set of one or more cells included in a neighbor cell list, determine whether at least one condition is satisfied with respect to at least one of the serving cell and the first set of one or more cells, and perform a second cell measurement to detect a second set of one or more cells that are not included in the neighbor cell list, when the at least one condition is satisfied; a determining module to determine one or more candidate cells that satisfy cell reselection criteria from among the first set of one or more cells when the at least one condition is not satisfied, and from among the first set of one or more cells and the second set of one or more cells when the at least one condition is satisfied; and a cell selection control module to reselect one of the one or more candidate cells.

FIG. 1 is a diagram illustrating a scenario in which a neighbor cell for cell reselection is not detected in a cellular mobile communication system, according to an embodiment of the present disclosure.

Referring to FIG. 1, when a network is configured, a neighbor cell list is configured based on a path order from base station A, to base station B, to base station C, and to base station D, along which a mobile terminal moves. For example, base station A broadcasts a neighbor cell list including base stations B and C. Base station B broadcasts a neighbor cell list including base stations A and C. Base station C broadcasts a neighbor cell list including base stations B and D. Base station D broadcasts a neighbor cell list including base stations A and C.

However, when a mobile terminal moves along a path from base station A, to base station B, and to base station D, base station D is not included in the neighbor cell list of base station B. Thus, the mobile terminal may execute a cell measurement procedure with respect to base station A and base station C, which are included in the neighbor cell list of base station B. Therefore, the mobile terminal fails to reselect base station D, and executes a cell selection procedure after a predetermined period of time.

Hereinafter, various embodiments of the present disclosure will describe an electronic device for cell reselection in a cellular mobile communication system and an operation method thereof.

In particular, various embodiments of the present disclosure include a procedure performed while the electronic device is in an idle state in a cellular mobile communication system. The procedure includes performing cell measurement procedure for searching for cells that are not included in a neighbor cell list provided from a network (hereinafter referred to as detected cell measurement), managing the detected cells, and performing reselection on the detected cells.

Figure 2:
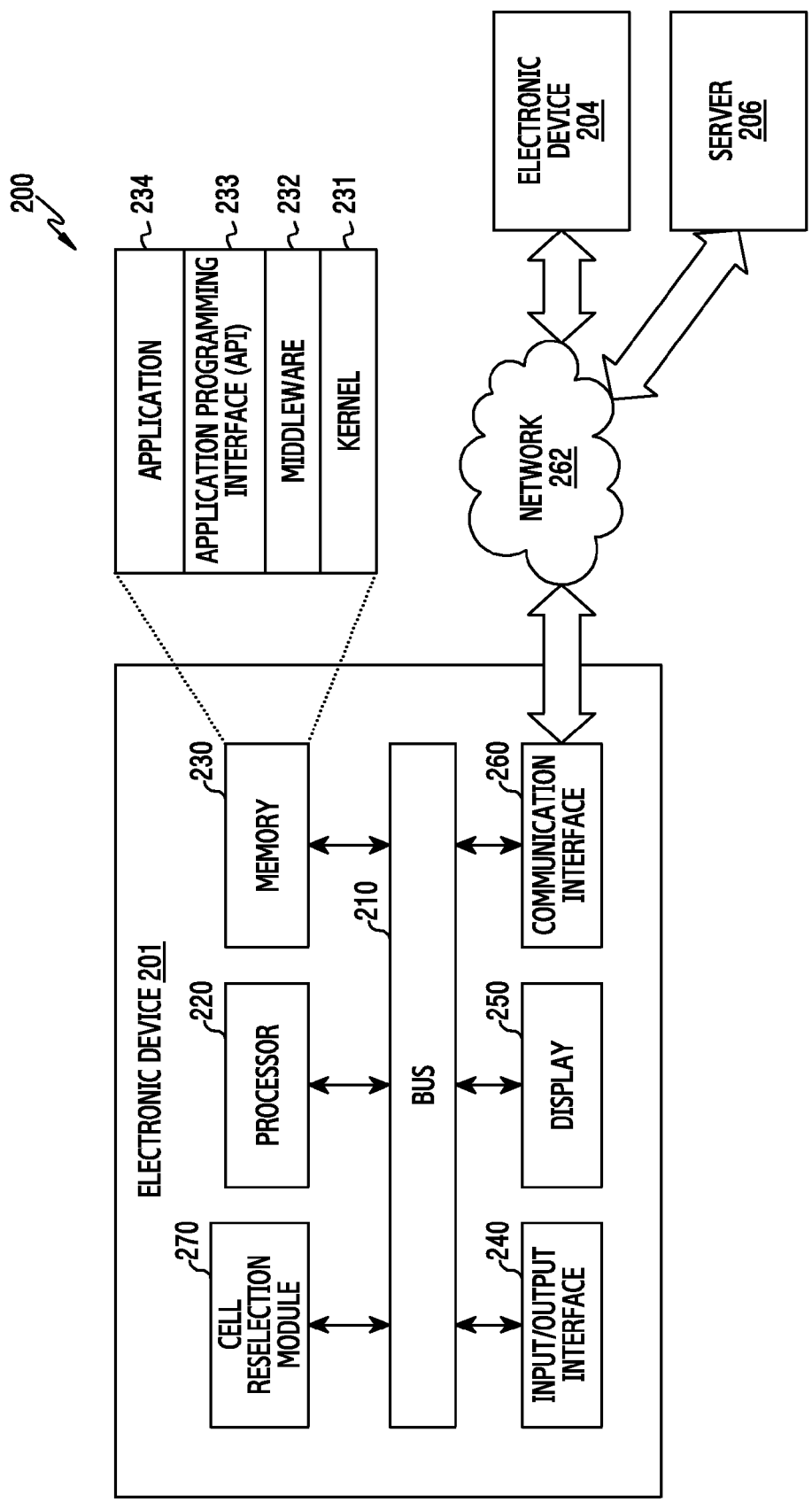
FIG. 2 is a diagram illustrating a network environment including an electronic device, according to an embodiment of the present disclosure.

FIG. 2 is a diagram illustrating a network environment including an electronic device, according to an embodiment of the present disclosure. Referring to FIG. 2, an electronic device 201 in a network environment 200 includes a bus 210, a processor 220, a memory 230, an input/output interface 240, a display 250, a communication interface 260, and a cell reselection module 270.

The bus 210 may be a circuit for connecting the aforementioned component elements and transmitting communication (for example, a control message) between the aforementioned component elements.

The processor 220 may receive instructions from the aforementioned other component elements (for example, the memory 230, the input/output interface 240, the display, the communication interface 260, the cell reselection module 270, or the like) through the bus 210, may decipher the received instructions, and may perform calculations or data processing according to the deciphered instructions.

The memory 230 may store instructions or data received from or created by the processor 220 or the other component elements (for example, the input/output interface 240, the display 250, the communication interface 260, the cell reselection module 270, or the like). The memory 230 includes programming modules, for example, a kernel 231, middleware 232, an application programming interface (API) 233, an application 234, or the like. Each of the programming modules may be formed of software, firmware, hardware, or a combination of two or more thereof.

The kernel 231 may control or manage system resources (for example, the bus 210, the processor 220, the memory 230, or the like) used for performing an operation or a function implemented in the remaining other programming modules, for example, the middleware 232, the API 233, or the application 234. In addition, the kernel 231 may provide an interface through which the middleware 232, the API 233, or the application 234 may control or manage the individual component elements of the electronic device 201 while accessing the individual component elements.

The middleware 232 may perform a relay function of allowing the API 233 or the application 234 to communicate with the kernel 231 to exchange data therewith. Furthermore, with respect to task requests received from the application 234, the middleware 232 may perform a control (for example, scheduling or load balancing) for the task requests using, for example, a method of assigning at least one application 234 a priority for using the system resources (for example, the bus 210, the processor 220, the memory 230, or the like) of the electronic device 201.

The API 233 is an interface through which the application 234 may control functions provided by the kernel 231 and the middleware 232, and may include at least one interface or function (for example, instruction) for file control, window control, image processing, character control, or the like.

According to various embodiments, the application 234 may include a short message service(SMS)/multimedia messaging service (MMS) application, an e-mail application, a calendar application, an alarm application, a health care application (for example, an application for measuring an amount of exercise or blood sugar), an environmental information application (for example, an application for providing information associated with atmospheric pressure, humidity, temperature, and the like), or the like. Additionally or alternatively, the application 234 may be an application related to exchanging information between the electronic device 201 and an external electronic device (for example, an electronic device 204). The application related to exchanging information may include, for example, a notification relay application for transferring particular information to the external electronic device or a device management application for managing the external electronic device.

For example, the notification relay application may include a function of transferring notification information generated in other applications (for example, the SMS/MMS application, the e-mail application, the health care application, the environmental information application, or the like) of the electronic device 201 to an external electronic device 204. Additionally or alternatively, the notification relay application may, for example, receive notification information from the external electronic device 204, and may provide the received notification information to a user. For example, the device management application may manage (for example, install, delete, or update) functions for at least some of the external electronic device 204 communicating with the electronic device 201 (for example, turning on/off the external electronic device 204 itself (or some component elements thereof) or adjusting brightness (or resolution) of a display), applications operating in the external electronic device 204, or services (for example, a telephone call service or a message service) provided from the external electronic device 204.

According to various embodiments, the application 234 may include applications, which are designated according to a property (for example, a type of electronic device) of the external electronic device 204. For example, in cases where the external electronic device 204 is an MP3 player, the application 234 may be related to the reproduction of music. Similarly, in cases where the external electronic device 204 is a mobile medical appliance, the application 234 may be related to health care. According to an embodiment of the present disclosure, the application 234 may include at least one of an application designated in the electronic device 201 and an application received from a server 206 or the external electronic device 204.

The input/output interface 240 may transfer instructions or data input from a user through an input/output device (for example, a sensor, a keyboard, or a touch screen) to the processor 220, the memory 230, the communication interface 260, or the cell reselection module 270 through, for example, the bus 210. For example, the input/output interface 240 may provide, to the processor 220, data regarding a user's touch input through a touch screen. Furthermore, through the input/output device (for example, a speaker or a display), the input/output interface 240 may output instructions or data received from the processor 220, the memory 230, the communication interface 260, or the cell reselection module 270 through, for example, the bus 210. For example, the input/output interface 240 may output voice data, processed through the processor 220, to a user through a speaker.

The display 250 may display various pieces of information (for example, multimedia data, text data, or the like) to a user.

The communication interface 260 may connect communication between the electronic device 201 and the external electronic device 204 or the server 206. For example, the communication interface 260 may be connected to a network 262 through wireless or wired communication to communicate with the external device. The wireless communication may include at least one of, for example, Wi-Fi, Bluetooth (BT), near field communication (NFC), GPS, and cellular communication (for example, long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like.). The wired communication may include, for example, at least one of universal serial bus (USB), high definition multimedia interface (HDMI), Recommended Standard 232 (RS-232), and plain old telephone service (POTS).

According to an embodiment of the present disclosure, the network 262 may be a telecommunication network. The communication network may include at least one of a computer network, the Internet, the Internet of things, and a telephone network. According to an embodiment of the present disclosure, a protocol (for example, a transport layer protocol, a data link layer protocol, or a physical layer protocol) for communication between the electronic device 201 and the external electronic device 204 may be supported by at least one of the application 234, the application programming interface 233, the middleware 232, the kernel 231, and the communication interface 260.

According to an embodiment of the present disclosure, the cell reselection module 270 may process at least a part of information obtained from other component elements (for example, the processor 220, the memory 230, the input/output interface 240, the communication interface 260, or the like) and provide the processed information to a user in various ways. For example, the cell reselection module 270 may control at least some functions of the electronic device 201, while in an idle state, so as to execute (1) cell measurement for searching for cells that are not included in a neighbor cell list provided from a network (hereinafter, referred to as detected cell measurement), (2) management of the detected cells, and (3) execution of reselection on the detected cells.

Figure 3:
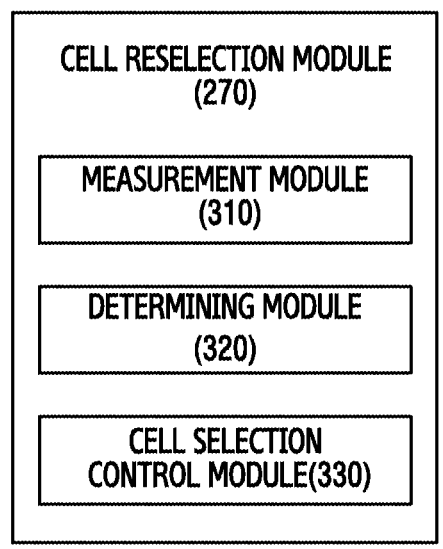
FIG. 3 is a block diagram of a cell reselection module of the electronic device of FIG. 2, according to an embodiment of the present disclosure.

FIG. 3 is a block diagram illustrating a cell reselection module of an electronic device, according to an embodiment of the present disclosure. Referring to FIG. 3, the cell reselection module 270 includes a measurement module 310, a determining module 320, and a cell selection control module 330.

The measurement module 310 may measure reception powers of cells included in a neighbor cell list or a detected cell list. For example, the measurement module 310 may measure a pilot signal transmitted from a base station to an electronic device, a reception power of a reference signal, or a signal-to-interference ratio (for example, Ec/Io). The Ec/Io refers to a ratio of pilot signal energy accumulated during one PN chip period to a total power spectrum density in a reception band, and may represent a reception sensitivity of an electronic device. The neighbor cell list may be information provided to a mobile terminal through a system information block (SIB). The detected cell list may include cells remaining after excluding the cells included in the neighbor cell list from those cells detected through a cell search procedure of the mobile terminal, as described in greater detail below with respect to FIG. 7.

The determining module 320 may determine cell reselection based on a cell measurement result from the measurement module 310. For example, when a reception level of a serving cell is greater than a first threshold value, an electronic device may stay in the serving cell. Otherwise, cell reselection may be triggered for selecting another cell. A condition for triggering the cell reselection may be transferred through system information (for example, SIB #3 and #4).

In addition, the determining module 320 may determine a measurement for detecting other cells, excluding the cells in the neighbor cell list (hereinafter referred to as detected cell measurement). For example, the determining module 320 may execute the detected cell measurement when at least one condition is satisfied from among a condition (hereinafter referred to as a first condition) in which a signal quality of a serving cell (for example, Ec/Io or received signal code power (RSCP)) drops to less than or equal to a second threshold value, a condition (hereinafter referred to as a second condition) in which at least one cell included in a neighbor cell list is not detected during a predetermined period of time or during a predetermined number of measurements, and a condition (hereinafter referred to as a third condition) in which a serving cell is changed.

The second threshold value for determining whether to execute the detected cell measurement may be equal to or different from the first threshold value for determining cell reselection. In addition, the second threshold value may be broadcasted from a base station to the electronic device as system information in the same manner as the first threshold value, or may be a predetermined value and may not need to be broadcasted from a base station to the electronic device. Desirably, the second threshold value may be determined to be a value that is greater than the first threshold value, and is predetermined in the electronic device. In addition, the second threshold value may be set to be identical or different for each terminal.

The cell selection control module 330 may control cell reselection based on a result of the determination of the determining module 320. In addition, when triggering for the cell reselection occurs, the cell selection control module 330 may select a cell that satisfies cell reselection criteria from the neighbor cell list or the detected cell list. Parameters required for the cell reselection may be determined based on system information broadcasted from a corresponding cell. Alternatively, when reselection parameters for cells included in the detected cell list are not received from the corresponding cells, reselection parameters of cells included in the neighbor cell list may be used.

When a cell in the neighbor cell list and a cell in the detected cell list simultaneously satisfy the cell reselection criteria, the cell selection control module 330 may execute a control to preferentially reselect the cell included in the neighbor cell list.

Figure 7:
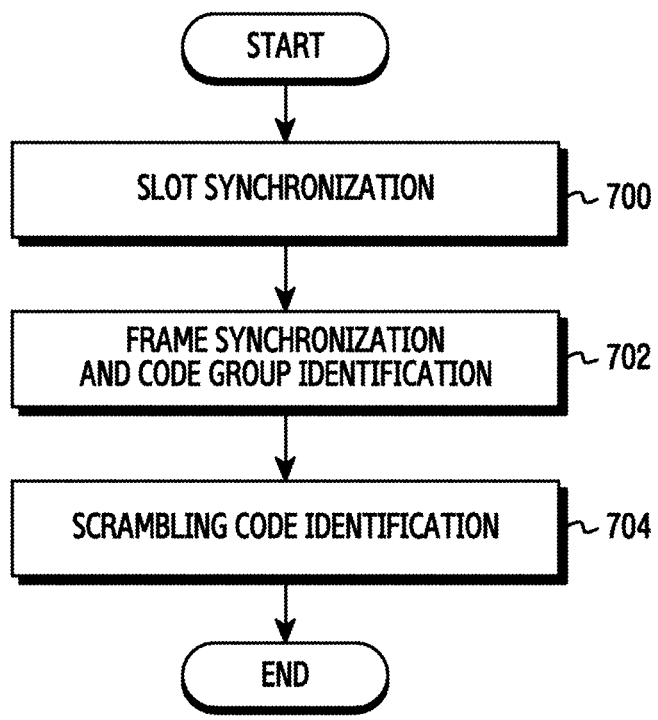
FIG. 7 is a flowchart illustrating a cell search procedure for cells included in a detected cell list, according to an embodiment of the present disclosure.

Also, when the detected cell measurement is triggered, the cell selection control module 330 may detect at least one cell through a cell search procedure of FIG. 7, and generate and manage a list of the detected cells.

Figure 4:
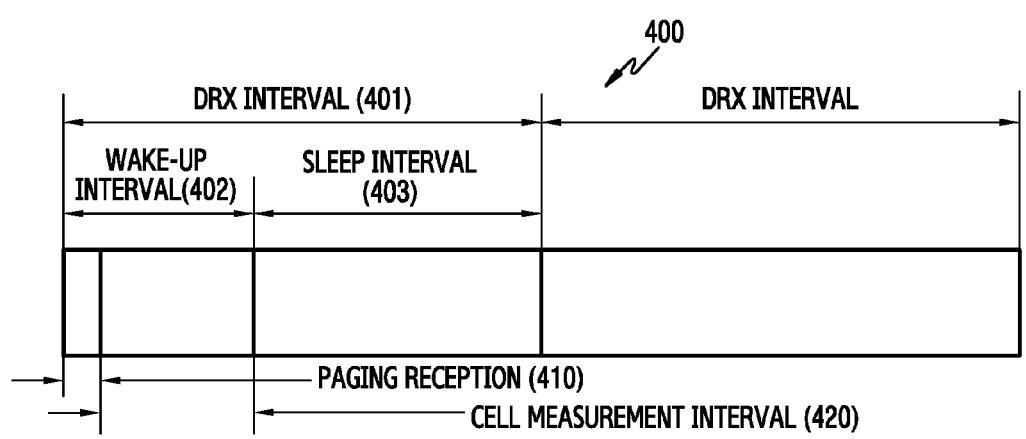
FIG. 4 is a diagram illustrating a discontinuous reception (DRX) cycle, according to an embodiment of the present disclosure.

FIG. 4 is a diagram illustrating a DRX cycle, according to an embodiment of the present disclosure.

Referring to FIG. 4, a DRX cycle (or interval) 401 is divided into a wake-up interval 402 and a sleep interval 403. In the wake-up interval 402, a mobile terminal executes paging signal reception 410 in a wake-up state and neighbor cell measurement 420 for cell reselection (hereinafter referred to as cell measurement). In the sleep interval 403, a supply of power and a clock are blocked to unused modules of the mobile terminal.

In the paging interval 410, information is transmitted that indicates whether a call or data exists that mobile terminals are to receive. The mobile terminal may determine whether its paging identifier is included in the received paging information.

In the cell measurement interval 420, reception powers of neighbor cells are measured in order to determine cell reselection criteria. For example, the cell measurement 420 may indicate a measurement of a pilot signal transmitted from a base station to an electronic device, a reception power of a reference signal, or a signal-to-interference ratio (for example, $E_c/I_o$).

During the cell measurement interval 420, measurement may be performed with respect to first cells in the neighbor cell list or second cells in the detected cell list. The neighbor cell list may include information provided to a mobile terminal through SIB #11 and #12, and the detected cell list is a list of at least one cell detected through a cell search procedure of the mobile terminal of FIG. 7.

For example, cells included in the neighbor cell list and cells that are not included in the neighbor cell list are detected through the cell search procedure of FIG. 7, and concurrently, measurement with respect to the detected cells may be performed. In addition, measurement with respect to cells included in neighbor cell lists may be performed through a cell search procedure of FIG. 8, described in detail below.

Figure 8:
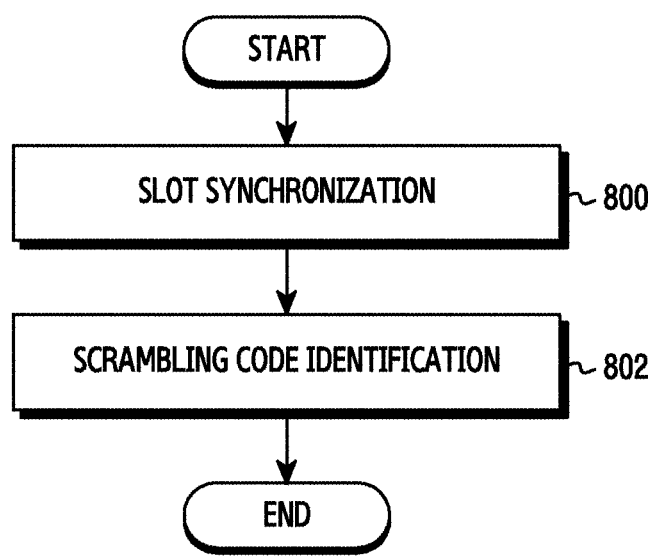
FIG. 8 is a flowchart illustrating a cell search procedure for cells included in a neighbor cell list, according to an embodiment of the present disclosure.

That is, when the neighbor cell list is received through SIB #11 and #12, and scrambling search related information with respect to a neighbor cell is received, the mobile terminal may execute measurement with respect to cells included in the neighbor cell list based on the cell search procedure of FIG. 8. Conversely, when information associated with any cell is not received, the mobile terminal may execute cell measurement based on the cell search procedure of FIG. 7.

Figure 5:
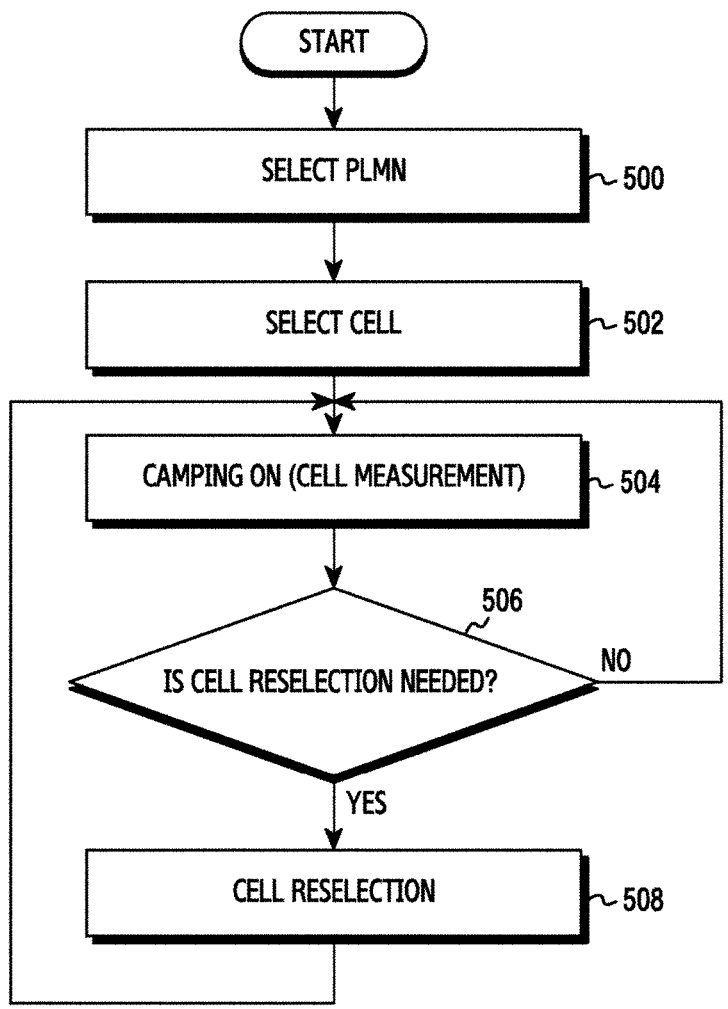
FIG. 5 is a flowchart illustrating a network entry procedure of a mobile terminal, according to an embodiment of the present disclosure.

FIG. 5 is a flowchart illustrating a network entry procedure of a mobile terminal, according to an embodiment of the present disclosure.

Referring to FIG. 5, the mobile terminal searches for/selects an available public land mobile network (PLMN) by scanning radio frequency (RF) channels when the mobile terminal is powered on, in step 500.

The mobile terminal selects a cell having the strongest signal from among cells in the PLMN, in step 502, and camps on the selected cell, in step 504. While in the camp-on state, the mobile terminal may monitor related system information or execute a measurement (for example, cell measurement) required for a cell reselection evaluation process. The camp-on state is described in greater detail below with reference to FIG. 6.

The mobile terminal determines whether cell reselection is required, based on a cell measurement, in step 506. For example, the mobile terminal may determine whether a cell exists that has a better channel state than the cell on which the mobile terminal currently camps.

When cell reselection is not required, the mobile terminal returns to step 504 and continues to camp on the previously selected cell. When cell reselection is required, the mobile terminal reselect a cell having a better channel, and camps on the reselected cell, in step 508.

Figure 6:
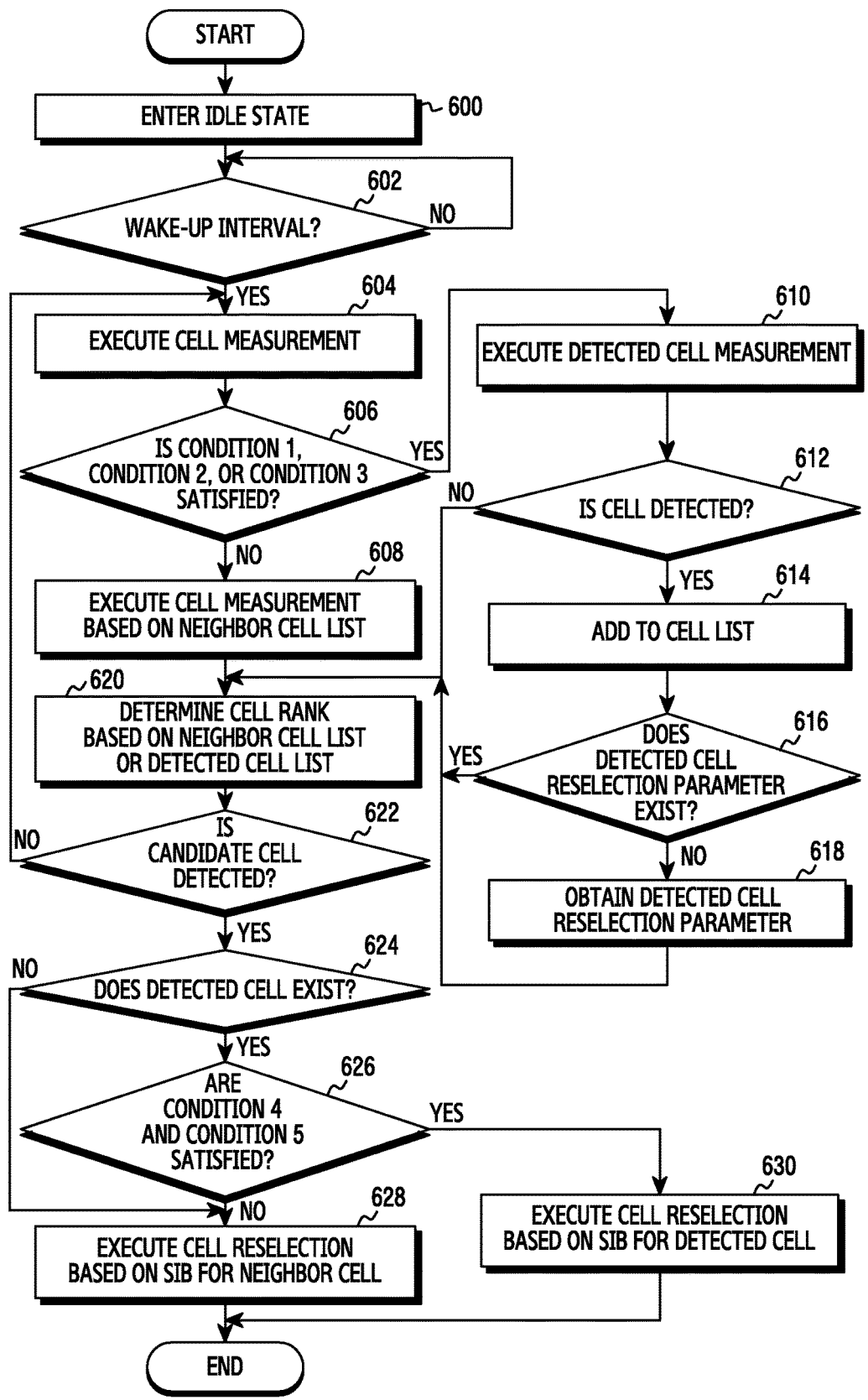
FIG. 6 is a flowchart illustrating a cell reselection procedure of a mobile terminal in a cellular mobile communication system, according to an embodiment of the present disclosure.

FIG. 6 is a flowchart illustrating a cell reselection procedure of a mobile terminal in a cellular mobile communication system, according to an embodiment of the present disclosure.

Referring to FIG. 6, the mobile terminal enters an idle mode or state when an incoming/out-going call and transmitted/received data does not exist, in step 600.

In step 602, the mobile terminal determines whether it is in a wake-up interval of the DRX cycle of FIG. 4.

When the mobile terminal is not in the wake-up interval of the DRX cycle, the mobile terminal maintains a sleep state and continues to perform step 602.

When the mobile terminal is in the wake-up interval of the DRX cycle, the mobile terminal executes paging reception and first cell measurement, in step 604. For example, the first cell measurement may be a measurement of common pilot channel (CPICH) Ec/Io or CPICH received signal code power (RSCP) of a serving cell or a cell included in a neighbor cell list. The first measurement may be performed during a predetermined period of time, or may be performed as many as a predetermined number of times.

The mobile terminal determines whether to execute detected cell measurement, based on the first cell measurement, in step 606. That is, the mobile terminal detects cells that are not included in the neighbor cell list through a cell search procedure of FIG. 7, and determines whether to execute measurement with respect to the detected cells.

For example, when at least one of the following conditions is satisfied, the mobile terminal executes detected cell measurement (hereinafter referred to as second cell measurement) with respect to a cell that is not included in the neighbor cell list, through the cell search procedure of FIG. 7, in operation 610. Conversely, when the following conditions are not satisfied, the mobile terminal executes cell measurement (for example, the first cell measurement) with respect to cells included in the neighbor cell list, through a cell search procedure of FIG. 8, in step 608.

Condition 1. A quality of a serving cell (for example, CPICH Ec/Io or CPICH RSCP) drops to less than or equal to a threshold value (Q_serv).

Condition 2. A cell in a neighbor cell list is not detected during a predetermined period of time (T_detected).

Condition 3. A serving cell is changed.

When at least one of the conditions is satisfied, the detected cell measurement may be performed, in step 610, during a T_initial time and as many as N_initial times.

According to an embodiment of the present disclosure, during the cell search procedure of FIG. 7, cells included in a neighbor cell list and cells that are not included in the neighbor cell list may be detected.

According to an embodiment of the present disclosure, the cell search procedure of FIG. 7 may be performed with respect to only the detected cells, and may not be performed for cells included in the neighbor cell list.

In step 612, it is determined whether cells that are not included in the neighbor cell list are detected through the second cell measurement. When cells that are not included in the neighbor cell list are detected through the second cell measurement, the mobile terminal adds the detected cells to a corresponding list, in step 614. For example, the mobile terminal may add the detected cells to the neighbor cell list, or may generate and manage a separate list of cells (for example, a detected cell list).

The mobile terminal determines whether a parameter associated with reselection with respect to the detected cells exists, in step 616.

When a parameter associated with reselection with respect to the detected cells does not exist, the mobile terminal obtains a parameter associated with reselection with respect to the detected cells. For example, the mobile terminal receives system information broadcasted from the detected cell, so as to obtain a parameter associated with the cell reselection. For example, the parameter may be a parameter for determining a rank of each cell.

According to an embodiment of the present disclosure, a procedure of obtaining the parameter associated with the cell reselection may be deferrable until the cell reselection criteria are satisfied. Also, the cells included in the detected cell list may be measured periodically, together with the cells included in the neighbor cell list, until the cell reselection procedure is performed.

According to an embodiment of the present disclosure, a parameter associated with reselection of the detected cells may be replaced with a parameter used for a cell included in the neighbor cell list.

Upon execution of cell measurement based on the neighbor cell list in step 608, upon a determination that a cell is not detected in step 612, upon a determination that the detected cell reselection parameter exits in step 616, and upon obtaining the detected cell reselection parameter in step 618, the mobile terminal proceeds with step 620. In step 620, the mobile terminal determines ranks of the cells included in the neighbor cell list or the detected cell list, using a parameter associated with the cell reselection.

The mobile terminal determines whether a candidate cell that satisfies the cell reselection criteria is detected, in step 622.

When the candidate cell that satisfies the cell reselection criteria is not detected, the mobile terminal returns to step 604.

When the candidate cell that satisfies the cell reselection criteria is detected, the mobile terminal determines whether the candidate cell is included in the detected cell list, in step 624. Alternatively, the mobile terminal may determine whether the candidate cell is a cell that is added to the neighbor cell list.

When it is determined that the candidate cell is not included in the detected cell list, the mobile terminal executes cell reselection based on a system information block (SIB) for a neighbor cell, in step 628.

When it is determined that the candidate cell is included in the detected cell list, it is determined whether Condition 4 and Condition 5 are both satisfied, in step 626.

Condition 4: detected cell quality>Neighbor cell quality+Q_penality

Q_penalty: a condition for assigning a cell in a neighboring cell list a priority, which may be greater than or equal to 0.

Condition 5: Detected cell quality>Q_threshold

Conditions 4 and 5 relate to the case in which a signal quality of a detected cell is greater than a predetermined threshold value.

According to an embodiment of the present disclosure, conditions 4 and 5 relate to the case in which a signal quality of a neighbor cell that satisfies cell reselection criteria is less than or equal to a predetermined threshold value.

When Condition 4 and Condition 5 are not satisfied, the mobile terminal executes cell reselection based on an SIB for the neighbor cell, in step 628.

Conversely, when condition 4 and condition 5 are satisfied, the mobile terminal executes cell reselection based on an SIB for a detected cell, in step 630.

That is, when cells that satisfy the cell reselection criteria are a cell included in the neighbor cell list and a cell in the detected cell list, the mobile terminal determines to preferentially reselect the cell in the neighbor cell list. When a threshold value is not satisfied even though the cell in the neighbor cell list is prioritized, the cell in the detected cell list may be reselected.

FIG. 7 is a flowchart illustrating a cell search procedure with respect to cells included in a detected cell list, according to an embodiment of the present disclosure.

Referring to FIG. 7, the cell search procedure includes performing slot synchronization, in step 700. Frame synchronization and code-group identification are performed, in step 702. Scrambling-code identification is performed, in step 704. The slot synchronization may obtain slot synchronization by matching a first synchronization code and a received signal using a matched filter. The frame synchronization and code-group identification may obtain frame synchronization by using a second synchronization code and identifying a code group. Scrambling-code identification may determine a scrambling code using symbol by symbol correlation.

Through the cell search procedure of FIG. 7, a cell that is not included in a neighbor cell list may be detected in addition to a cell included in the neighbor cell list.

FIG. 8 is a flowchart illustrating a cell search procedure with respect to cells included in a neighbor cell list, according to an embodiment of the present disclosure.

Referring to FIG. 8, the cell search procedure includes performing slot synchronization, in step 800. Scrambling-code identification is performed, in step 802. The slot synchronization may obtain slot synchronization by matching a first synchronization code and a received signal using a matched filter. When information associated with a scrambling code is obtained with respect to cells of the neighbor cell list through the system information, frame-synchronization and code-group identification may be omitted.

Therefore, through the simple cell search procedure of FIG. 8, measurement is performed with respect to the cells of the neighbor cell list, and cells that are not included in the neighbor cell list may not be detected.

Figure 9:
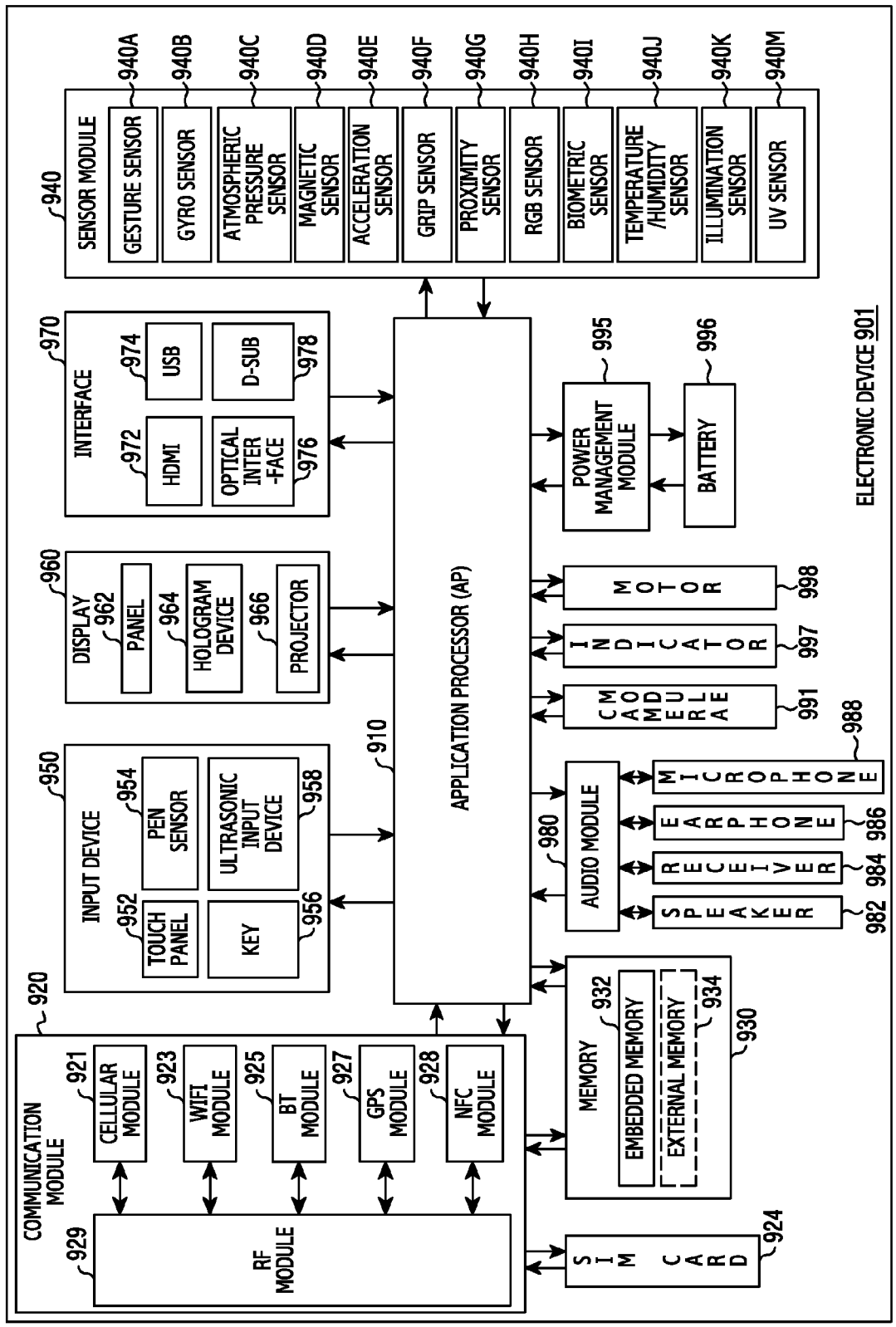
FIG. 9 is a block diagram of an electronic device, according to an embodiment of the present disclosure.

FIG. 9 is a block diagram of an electronic device, according to an embodiment of the present disclosure. An electronic device 901 may form, for example, a part or the entirety of the electronic device 201 illustrated in FIG. 2. Referring to FIG. 9, the electronic device 901 includes one or more application processors (AP) 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may control a plurality of hardware or software component elements connected to the AP 910 by driving an operating system or an application program, and may execute data processing and calculation with respect to various types of data including multimedia data. The AP 910 may be embodied as, for example, a system on chip (SoC). According to an embodiment of the present disclosure, the AP 910 may further include a graphic processing unit (GPU).

The communication module 920 (for example, the communication interface 160) may execute data transmission and reception in communication between the electronic device 901 (for example, the electronic device 201) and other electronic devices (for example, the external electronic device 204 or the server 206) connected over a network. According to an embodiment of the present disclosure, the communication module 920 includes a cellular module 921, a Wi-Fi module 923, a BT module 925, a GPS module 927, an NFC module 928, and a RF module 929.

The cellular module 921 may provide a voice call, a video call, an SMS service, an Internet service, and the like through a communication network (for example, LTE, LTE-A, CDMA, WCDMA, UMTS, WiBro, GSM or the like). Furthermore, the cellular module 921 may distinguish and authenticate electronic devices within a communication network using, for example, a SIM (for example, the SIM card 924). According to an embodiment of the present disclosure, the cellular module 921 may perform at least some functions that the AP 910 may provide. For example, the cellular module 921 may perform at least some of the multimedia control functions.

According to an embodiment of the present disclosure, the cellular module 921 may include a communication processor (CP). Furthermore, the cellular module 921 may be embodied as, for example, an SoC. Although the component elements, such as the cellular module 921 (for example, a communication processor), the memory 930, the power management module 995, or the like, are illustrated as separate components from the AP 910 in FIG. 9, the AP 910 may include at least some of the above described component elements (for example, cellular module 921), according to an embodiment of the present disclosure.

According to an embodiment of the present disclosure, the AP 910 or the cellular module 921 (for example, a communication processor) may load, into a volatile memory, an instruction or data received from at least one of a non-volatile memory and other component elements connected thereto, and may process the loaded instruction or data. Further, the AP 910 or the cellular module 921 may store, in a non-volatile memory, data received from at least one other component element or generated by at least one other component element.

Each of the Wi-Fi module 923, the BT module 925, the GPS module 927, and the NFC module 928 may include, for example, a processor for processing data transmitted or received through a corresponding module. Although the cellular module 921, the WiFi module 923, the BT module 925, the GPS module 927, and the NFC module 928 are illustrated as separate blocks in FIG. 9, at least some (for example, two or more) of the cellular module 921, the WiFi module 923, the BT module 925, the GPS module 927, and the NFC module 928 may be included in one integrated circuit (IC) or one IC package, according to an embodiment of the present disclosure. For example, at least some of the processors corresponding respectively to the cellular module 921, the Wi-Fi module 923, the BT module 925, the GPS module 927, and the NFC module 928 (for example, a CP corresponding to the cellular module 921 and a Wi-Fi processor corresponding to the Wi-Fi module 923) may be embodied as one SoC.

The RF module 929 may transmit/receive data, for example, an RF signal. Although not illustrated in the drawing, the RF module 929 may include, for example, a transceiver, a power amp module (PAM), a frequency filter, a low noise amplifier (LNA), or the like. Furthermore, the RF module 929 may further include a component for transmitting/receiving electronic waves over a free air space in wireless communication, for example, a conductor, a conducting wire, or the like. Although it is illustrated that the cellular module 921, the Wi-Fi module 923, the BT module 925, the GPS module 927, and the NFC module 928 share one RF module 929 in FIG. 9, at least one of the cellular module 921, the Wi-Fi module 923, the BT module 925, the GPS module 927, and the NFC module 928 may transmit/receive an RF signal through a separate RF module, according to an embodiment of the present disclosure.

The SIM card 924 may be inserted into a slot formed in a particular portion of an electronic device. The SIM card 924 may include unique identification information (for example, an integrated circuit card identifier (ICCID)) or subscriber information (for example, an international mobile subscriber identity (IMSI)).

The memory 930 (for example, the memory 230) includes at least one of an embedded memory 932 and an external memory 934. The embedded memory 932 may include at least one of a volatile memory (for example, a dynamic random access memory (DRAM), a static random access memory (SRAM), a synchronous DRAM (SDRAM), and the like) and a non-volatile memory (for example, a one time programmable read only memory (OTPROM), a programmable read only memory (PROM), an erasable PROM (EPROM), an electrically EPROM (EEPROM), a mask read only memory (ROM), a flash ROM, a NAND flash memory, a NOR flash memory, and the like).

According to an embodiment of the present disclosure, the embedded memory 932 may be a solid state drive (SSD). The external memory 934 may further include a flash drive, for example, a compact flash (CF), a secure digital (SD), a micro-SD, a mini-SD, an extreme digital (xD), a memory stick, or the like. The external memory 934 may be functionally connected with the electronic device 901 through various interfaces. According to an embodiment of the present disclosure, the electronic device 901 may further include a storage device (or a storage medium) such as, for example, a hard disk drive.

The sensor module 940 may measure a physical quantity or detect an operation state of the electronic device 901, and may convert the measured or detected information into an electric signal. The sensor module 940 includes, for example, at least one of a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (for example, red, green, and blue (RGB) sensor), a biometric sensor 9401, a temperature/humidity sensor 940J, an illumination sensor 940K, and an ultra violet (UV) sensor 940M. Additionally or alternatively, the sensor module 940 may include, for example, an e-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 940 may further include a control circuit for controlling one or more sensors included therein.

The input device 950 includes at least one of a touch panel 952, a (digital) pen sensor 954, a key 956, and an ultrasonic input device 958. The touch panel 952 may recognize a touch input, for example, in at least one of a capacitive scheme, a resistive scheme, an infrared scheme, and an ultrasonic scheme. Further, the touch panel 952 may further include a control circuit. The capacitive touch panel may be able to recognize physical contact or proximity. The touch panel 952 may further include a tactile layer. In this instance, the touch panel 952 may provide a tactile response to a user.

The (digital) pen sensor 954 may be implemented, for example, using a method identical or similar to receiving a user's touch input, or using a separate recognition sheet. The key 956 may include, for example, a physical button, an optical key, or a keypad. The ultrasonic input device 958 may identify data by detecting a sound wave with a microphone 988 of the electronic device 901 through an input unit generating an ultrasonic signal, and may perform wireless recognition. According to an embodiment of the present disclosure, the electronic device 901 may receive a user input from an external device (for example, a network, a computer, or a server) that is connected with the electronic device 901 by using the communication module 920.

The display 960 (for example, the display 250) includes at least one of a panel 962, a hologram device 964, and a projector 966. The panel 962 may be, for example, a liquid crystal display (LCD), an active matrix organic light emitting diode (AM-OLED), or the like. The panel 962 may be embodied to be, for example, flexible, transparent, or wearable. The panel 962 may be integrated with the touch panel 952 as a single module. The hologram device 964 may show a stereoscopic image in the air using interference of light. The projector 966 may project light onto a screen to display an image. The screen may be located, for example, inside or outside the electronic device 901. According to an embodiment of the present disclosure, the display 960 may further include a control circuit for controlling the panel 962, the hologram device 964, or the projector 966.

The interface 970 includes at least one of an HDMI 972, a USB 974, an optical interface 976, and a D-subminiature (D-sub) 978. The interface 970 may be included in, for example, the communication interface 260 illustrated in FIG. 2. Additionally or alternatively, the interface 970 may include, for example, a mobile high-definition link(MHL) interface, an SD/multi-media card (MMC) interface, or an infrared data association (IrDA) standard interface.

The audio module 980 may bilaterally convert a sound and an electric signal. At least some component elements of the audio module 980 may be included in, for example, the input/output interface 240 illustrated in FIG. 2. The audio module 980 may process sound information input or output through, for example, a speaker 982, a receiver 984, earphones 986, the microphone 988, or the like.

The camera module 991 is a device for capturing a still image or a video, and according to an embodiment of the present disclosure, may include one or more image sensors (for example, a front sensor or a rear sensor), a lens, an image signal processor (ISP), or a flash (for example, an LED or xenon lamp).

The power management module 995 may manage power of the electronic device 901. Although not illustrated, the power management module 995 may include, for example, a power management integrated circuit (PMIC), a charger IC, or a battery gauge.

The PMIC may, for example, be mounted in an IC or an SoC semiconductor. The charging methods may be classified into wired charging and wireless charging. The charger IC may charge a battery and may prevent an over voltage or over current from flowing from a charger. According to an embodiment of the present disclosure, the charger IC may include a charger IC for at least one of the wired charging method and the wireless charging method. Examples of the wireless charging may include magnetic resonance charging, magnetic induction charging, and electromagnetic charging, and an additional circuit such as a coil loop, a resonance circuit, a rectifier and the like may be added for the wireless charging.

The battery gauge may measure, for example, a residual quantity of the battery 996, or a voltage, a current, or a temperature during the charging. The battery 996 may store or generate electricity, and may supply power to the electronic device 901 using the stored or generated electricity. The battery 996 may include, for example, a rechargeable battery or a solar battery.

The indicator 997 may display a specific status of the electronic device 901 or a part (for example, the AP 910) of electronic device 901, for example, a boot-up status, a message status, a charging status, and the like. The motor 998 may convert an electrical signal into a mechanical vibration. Although not illustrated, the electronic device 901 may include a processing device (for example, a GPU) for supporting a mobile TV. The processing device for supporting a mobile TV may process media data according to standards such as, for example, digital multimedia broadcasting (DMB), digital video broadcasting (DVB), a media flow, or the like.

Each of the above-described elements of the electronic device, according embodiments to the present disclosure, may include one or more components, and the name of the relevant element may change depending on the type of electronic device. The electronic device, according to various embodiments of the present disclosure, may include at least one of the aforementioned elements. Some elements may be omitted or other additional elements may be further included in the electronic device. Further, some of the components of the electronic device, according to various embodiments of the present disclosure, may be combined to form a single entity, and thus, may equivalently execute functions of the corresponding elements prior to the combination.

The term "module", as used in various embodiments of the present disclosure, may refer to, for example, a "unit" including one of hardware, software, and firmware, or a combination of two or more of the hardware, software, and firmware. The term "module" may be interchangeably used with terms, such as unit, logic, logical block, component, or circuit. The module may be the smallest unit of an integrated component or a part thereof. The module may be the smallest unit that performs one or more functions or a part thereof. The module may be mechanically or electronically implemented. For example, the module, according to various embodiments of the present disclosure, may include at least one of an application-specific integrated circuit (ASIC) chip, field-programmable gate arrays (FPGAs), and a programmable-logic device for performing operations, which have been known or are to be developed hereafter.

According to various embodiments, at least a part of a device (for example, modules or functions thereof) or a method (for example, operations), according to the various embodiments of the present disclosure, may be embodied by, for example, a command stored in a computer readable storage medium in a form of a programming module. When the command is performed by one or more processors (for example, the processor 122), the one or more processors may execute a function corresponding to the command. The computer-readable storage medium may be, for example, the memory 130. At least a part of the programming module may be implemented (for example, performed) by, for example, the processor 210. At least a part of the programming module may include, for example, a module, a program, a routine, a set of instructions, and/or a process for performing one or more functions.

The computer readable recording medium may include magnetic media such as, for example, a hard disc, a floppy disc, and a magnetic tape, optical media such as, for example, a compact disc read only memory (CD-ROM) and a digital versatile disc (DVD), magneto-optical media such as, for example, a floptical disk, and hardware devices specifically configured to store and execute program commands, such as, for example, a ROM, a RAM, and a flash memory. In addition, the program instructions may include high class language codes, which can be performed in a computer by using an interpreter, as well as machine codes made by a compiler. The aforementioned hardware device may be configured to operate as one or more software modules in order to perform the operation of various embodiments of the present disclosure, and vice versa.

A programming module, according to embodiments of the present disclosure, may include at least one of the described component elements, a few of the component elements may be omitted, or additional component elements may be included. Operations performed by a module, a programming module, or other component elements, according to various embodiments of the present disclosure, may be performed sequentially, in parallel, repeatedly, or in a heuristic manner. Furthermore, some operations may be performed in a different order or may be omitted, or other operations may be added.

According to various embodiments of the present disclosure, a storage medium stores instructions, and the instructions are set to enable at least one processor to execute at least one operation when the instructions are performed by the at least one processor.

As described above, when a cell included in a neighbor cell list is not detected around a mobile terminal, the mobile terminal detects a cell that is not included in the neighbor cell list and executes cell reselection, so as to decrease the frequency of entering a state of 'out-of-service', which improves paging reception performance.

Also, this may decrease an inter-radio access technology (RAT)/inter-frequency cell reselection frequency and thus, paging reception performance may be improved.

In addition, through cell reselection of a cell having a good quality, the cell reselection frequency and current may be decreased.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method for operating a mobile terminal to execute cell reselection, the method comprising:
    performing a first cell measurement associated with a serving cell and at least one first cell included in a neighbor cell list;
    determining whether a first condition is satisifed based on the first cell measurement;
    performing a second cell measurement to detect at least one second cell not included in the neighbor cell list, of cells which are scanned for;
    determining one or more candidate cells that satisfy cell reselection criteria, from among the at least one first cell and the at least one second cell; and
    reselecting one of the one or more candidate cells,
    wherein the first condition comprises at least one of whether a signal strength of the serving cell is less than or equal to a threshold value, whether the at least one first cell is not detected during a predetermined period of time, or whether the serving cell is changed, wherein determining the one or more candidate cells comprises:
    determining the one or more candidate cells among the at least one second cell if a second condition is satisfied, wherein the second condition comprises:

a difference between a first quality value associated with the at least one first cell and a second quality value associated with the at least one second cell is bigger than a penalty value; and the first quality value is smaller than a threshold.

2. The method of claim 1, wherein the second cell measurement is performed during a predetermined period of time, or up to a predetermined number of times.

3. The method of claim 1, further comprising:
detecting the at least one second cell not included in the neighbor cell list;
generating a detected cell list based on the at least one second cell.

4. The method of claim 1, further comprising:
obtaining system information for cell reselection associated with the at least one second cell.

5. The method of claim 4, further comprising
using system information for cell reselection associated with a cell included in the neighbor cell list, if system information for the cell reselection associated with the at least one second cell does not exist.

6. The method of claim 1, wherein determining the one or more candidate cells comprises:
determining the one or more candidate cells among the at least one first cell if the second condition is not satisfied.

7. The method of claim 1, wherein the second cell measurement is a cell search procedure to obtain:
slot synchronization;
frame synchronization and code group identification; and
scrambling code identification.

8. The method of claim 1, wherein the first cell measurement is a cell search procedure to obtain:
slot synchronization; and
scrambling code identification.

9. A mobile terminal for cell reselection, the mobile terminal comprising:
at least one processor configured to:
perform a first cell measurement associated with a serving cell and at least one first cell included in a neighbor cell list;
determinine whether a first condition is satisfied based on the first cell measurement;
perform a second cell measurement to detect at least one second cell not included in the neighbor cell list, of cells which are scanned for;
determine one or more candidate cells that satisfy cell reselection criteria, from among the at least one first cell and the at least one second cell; and
reselect one of the one or more candidate cells,
wherein the first condition comprises at least one of whether a signal strength of the serving cell is less than or equal to a threshold value, whether the at least one first cell is not detected during a predetermined period of time, or whether the serving cell is changed, wherein the at least one processor is further configured to determine the one or more candidate cells among the at least one second cell if a second condition is satisfied,
wherein the second condition comprises:
a difference between a first quality value associated with the at least one first cell and a second quality value associated with the at least one second cell is bigger than a penalty value; and
the first quality value is smaller than a threshold.

10. The mobile terminal of claim 9 wherein the at least one processor is further configured to:
detect the at least one second cell not included in the neighbor cell list; and
generate a detected cell list based on the second cell measurement.

11. The mobile terminal of claim 9, wherein the at least one processor is further configured to obtain system information for cell reselection associated with the at least one second cell.

12. The mobile terminal of claim 11, wherein the at least one processor is further configured to use system information for cell reselection associated with at least one first cell included in the neighbor cell list, if system information for the cell reselection associated with the at least one second cell does not exist.

13. The mobile terminal of claim 9, wherein the at least one processor is, in order to determine the one or more candidiate cells, further configured to determine the one or more candidate cells among the at least one second cell if a second condition is satisfied,
wherein the second condition comprises:
a difference between a first quality value associated with the at least one first cell and a second quality value associated with the at least one second cell is bigger than a penalty threshold; and
the first quality value is smaller than a threshold.

14. The mobile terminal of claim 13, wherein the at least one processor is, in order to determine the one or more candidiate cells, configured to determine the one or more candidate cells among the at least one first cell if the second condition is not satisfied.

15. A system-on-chip for cell reselection of a mobile terminal, the system-on-chip configured to:
perform a first cell measurement associated with a serving cell and at least one first cell included in a neighbor cell list;
determine whether a first condition is satisfied based on the first cell measurement;
perform a second cell measurement to detect at least one second cell not included in the neighbor cell list, of cells which are scanned for;
determine one or more candidate cells that satisfy cell reselection criteria, from among the at least one first cell and the at least one second cell; and
reselect one of the one or more candidate cells,
wherein the first condition comprises at least one of whether a signal strength of the serving cell is less than or equal to a threshold value, whether the at least one first cell is not detected during a predetermined period of time, or whether the serving cell is changed, wherein the system-on-chip is further configured to determine the one or more candidate cells among the at least one second cell if a second condition is satisfied,
wherein the second condition comprises:
a difference between a first quality value associated with the at least one first cell and a second quality value associated with the at least one second cell is bigger than a penalty value; and
the first quality value is smaller than a threshold.

16. The system on-chip of claim 15,
wherein the system-on-chip is further configured to obtain system information for cell reselection associated with the at least one second cell.

* * * * *